(12) United States Patent
Miller

(10) Patent No.: US 8,334,804 B2
(45) Date of Patent: Dec. 18, 2012

(54) MULTI-FREQUENCY GNSS RECEIVER BASEBAND DSP

(75) Inventor: Steven R. Miller, Scottsdale, AZ (US)

(73) Assignee: Hemisphere GPS LLC, Calgary, Alberta (CA)

( * ) Notice: Subject to any disclaimer, the term of this patent is extended or adjusted under 35 U.S.C. 154(b) by 45 days.

(21) Appl. No.: 12/876,888

(22) Filed: Sep. 7, 2010

(65) Prior Publication Data

US 2011/0057834 A1    Mar. 10, 2011

Related U.S. Application Data

(60) Provisional application No. 61/240,098, filed on Sep. 4, 2009.

(51) Int. Cl.
*G01S 19/42* (2010.01)

(52) U.S. Cl. .................................. 342/357.25
(58) Field of Classification Search .............. 342/357.25
See application file for complete search history.

(56) References Cited

U.S. PATENT DOCUMENTS

| | | | |
|---|---|---|---|
| 3,585,537 A | 6/1971 | Rennick et al. |
| 3,596,228 A | 7/1971 | Reed, Jr. et al. |
| 3,727,710 A | 4/1973 | Sanders et al. |
| 3,815,272 A | 6/1974 | Marleau |
| 3,899,028 A | 8/1975 | Morris et al. |
| 3,987,456 A | 10/1976 | Gelin |
| 4,132,272 A | 1/1979 | Holloway et al. |
| 4,170,776 A | 10/1979 | MacDoran |
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,814,036 A | 3/1989 | Hatch |

(Continued)

FOREIGN PATENT DOCUMENTS

JP    07244150    9/1995

(Continued)

OTHER PUBLICATIONS

"ISR Notification & Written Opinion", PCT/US10/26509, (Apr. 20, 2010),1-7.

(Continued)

*Primary Examiner* — Harry Liu
(74) *Attorney, Agent, or Firm* — Law Office of Mark Brown, LLC; Mark E. Brown

(57) ABSTRACT

A dual-frequency DSP correlator receives I and Q signal components from a down convertor in a GNSS receiver system. The signal components are cross-wiped (de-spread) for noise cancellation and can be combined for use in a processor.

4 Claims, 8 Drawing Sheets

U.S. PATENT DOCUMENTS

| | | |
|---|---|---|
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen et al. |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cosenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller et al. |
| 6,014,101 A | 1/2000 | Loomis |
| 6,014,608 A | 1/2000 | Seo |
| 6,018,313 A | 1/2000 | Engelmayer et al. |
| 6,023,239 A | 2/2000 | Kovach |
| 6,052,647 A | 4/2000 | Parkinson et al. |
| 6,055,477 A | 4/2000 | McBurney et al. |
| 6,057,800 A | 5/2000 | Yang et al. |
| 6,061,390 A | 5/2000 | Meehan et al. |
| 6,061,632 A | 5/2000 | Dreier |
| 6,062,317 A | 5/2000 | Gharsalli |
| 6,069,583 A | 5/2000 | Silvestrin et al. |
| 6,076,612 A | 6/2000 | Carr et al. |
| 6,081,171 A | 6/2000 | Ella |
| 6,100,842 A | 8/2000 | Dreier et al. |
| 6,104,978 A | 8/2000 | Harrison et al. |
| 6,122,595 A | 9/2000 | Varley et al. |
| 6,128,574 A | 10/2000 | Diekhans |
| 6,144,335 A | 11/2000 | Rogers |
| 6,191,730 B1 | 2/2001 | Nelson, Jr. |
| 6,191,733 B1 | 2/2001 | Dizchavez |
| 6,198,430 B1 | 3/2001 | Hwang et al. |
| 6,198,992 B1 | 3/2001 | Winslow |
| 6,199,000 B1 | 3/2001 | Keller et al. |
| 6,205,401 B1 | 3/2001 | Pickhard et al. |
| 6,215,828 B1 | 4/2001 | Signell et al. |
| 6,229,479 B1 | 5/2001 | Kozlov et al. |
| 6,230,097 B1 | 5/2001 | Dance et al. |
| 6,233,511 B1 | 5/2001 | Berger et al. |

| | | | | | | |
|---|---|---|---|---|---|---|
| 6,236,916 B1 | 5/2001 | Staub et al. | | 7,026,982 B2 | 4/2006 | Toda et al. |
| 6,236,924 B1 | 5/2001 | Motz | | 7,027,918 B2 | 4/2006 | Zimmerman et al. |
| 6,253,160 B1 | 6/2001 | Hanseder | | 7,031,725 B2 | 4/2006 | Rorabaugh |
| 6,256,583 B1 | 7/2001 | Sutton | | 7,089,099 B2 | 8/2006 | Shostak et al. |
| 6,259,398 B1 | 7/2001 | Riley | | 7,142,956 B2 | 11/2006 | Heiniger et al. |
| 6,266,595 B1 | 7/2001 | Greatline et al. | | 7,155,335 B2 | 12/2006 | Rennels |
| 6,285,320 B1 | 9/2001 | Olster et al. | | 7,162,348 B2 | 1/2007 | McClure et al. |
| 6,292,132 B1 | 9/2001 | Wilson | | 7,191,061 B2 | 3/2007 | McKay et al. |
| 6,307,505 B1 | 10/2001 | Green | | 7,221,314 B2 | 5/2007 | Brabec et al. |
| 6,313,788 B1 | 11/2001 | Wilson | | 7,231,290 B2 | 6/2007 | Steichen et al. |
| 6,314,348 B1 | 11/2001 | Winslow | | 7,248,211 B2 | 7/2007 | Hatch et al. |
| 6,325,684 B1 | 12/2001 | Knight | | 7,271,766 B2 | 9/2007 | Zimmerman et al. |
| 6,336,066 B1 | 1/2002 | Pellenc et al. | | 7,277,784 B2 | 10/2007 | Weiss |
| 6,345,231 B2 | 2/2002 | Quincke | | 7,292,186 B2 | 11/2007 | Miller et al. |
| 6,356,602 B1 | 3/2002 | Rodal et al. | | 7,324,915 B2 | 1/2008 | Altman |
| 6,377,889 B1 | 4/2002 | Soest | | 7,358,896 B2 | 4/2008 | Gradincic et al. |
| 6,380,888 B1 | 4/2002 | Kucik | | 7,373,231 B2 | 5/2008 | McClure et al. |
| 6,389,345 B2 | 5/2002 | Phelps | | 7,388,539 B2 | 6/2008 | Whitehead et al. |
| 6,392,589 B1 | 5/2002 | Rogers et al. | | 7,395,769 B2 | 7/2008 | Jensen |
| 6,397,147 B1 | 5/2002 | Whitehead | | 7,428,259 B2 | 9/2008 | Wang et al. |
| 6,415,229 B1 | 7/2002 | Diekhans | | 7,437,230 B2 | 10/2008 | McClure et al. |
| 6,418,031 B1 | 7/2002 | Archambeault | | 7,451,030 B2 | 11/2008 | Eglington et al. |
| 6,421,003 B1 | 7/2002 | Riley et al. | | 7,479,900 B2 | 1/2009 | Horstemeyer |
| 6,424,915 B1 | 7/2002 | Fukuda et al. | | 7,505,848 B2 | 3/2009 | Flann et al. |
| 6,431,576 B1 | 8/2002 | Viaud et al. | | 7,522,099 B2 | 4/2009 | Zhodzishsky et al. |
| 6,434,462 B1 | 8/2002 | Bevly et al. | | 7,522,100 B2 | 4/2009 | Yang et al. |
| 6,445,983 B1 | 9/2002 | Dickson et al. | | 7,571,029 B2 | 8/2009 | Dai et al. |
| 6,445,990 B1 | 9/2002 | Manring | | 7,689,354 B2 | 3/2010 | Heiniger et al. |
| 6,449,558 B1 | 9/2002 | Small | | 2003/0014171 A1 | 1/2003 | Ma et al. |
| 6,463,091 B1 | 10/2002 | Zhodzicshsky et al. | | 2003/0093210 A1 | 5/2003 | Kondo et al. |
| 6,463,374 B1 | 10/2002 | Keller et al. | | 2003/0118086 A1* | 6/2003 | Pietila et al. .................. 375/150 |
| 6,466,871 B1 | 10/2002 | Reisman et al. | | 2003/0187560 A1 | 10/2003 | Keller et al. |
| 6,469,663 B1 | 10/2002 | Whitehead et al. | | 2003/0208319 A1 | 11/2003 | Ell et al. |
| 6,484,097 B2 | 11/2002 | Fuchs et al. | | 2004/0039514 A1 | 2/2004 | Steichen et al. |
| 6,501,422 B1 | 12/2002 | Nichols | | 2004/0212533 A1 | 10/2004 | Whitehead et al. |
| 6,515,619 B1 | 2/2003 | McKay, Jr. | | 2005/0080559 A1 | 4/2005 | Ishibashi et al. |
| 6,516,271 B2 | 2/2003 | Upadhyaya et al. | | 2005/0225955 A1 | 10/2005 | Grebenkemper et al. |
| 6,539,303 B2 | 3/2003 | McClure et al. | | 2005/0265494 A1 | 12/2005 | Goodlings |
| 6,542,077 B2 | 4/2003 | Joao | | 2006/0031664 A1 | 2/2006 | Wilson et al. |
| 6,549,835 B2 | 4/2003 | Deguchi | | 2006/0167600 A1 | 7/2006 | Nelson et al. |
| 6,553,299 B1 | 4/2003 | Keller et al. | | 2006/0206246 A1 | 9/2006 | Walker |
| 6,553,300 B2 | 4/2003 | Ma et al. | | 2006/0215739 A1 | 9/2006 | Williamson et al. |
| 6,553,311 B2 | 4/2003 | Ahearn et al. | | 2007/0078570 A1 | 4/2007 | Dai et al. |
| 6,570,534 B1 | 5/2003 | Cohen et al. | | 2007/0088447 A1 | 4/2007 | Stothert et al. |
| 6,577,952 B2 | 6/2003 | Geier et al. | | 2007/0121708 A1 | 5/2007 | Simpson |
| 6,587,761 B2 | 7/2003 | Kumar | | 2007/0205940 A1 | 9/2007 | Yang et al. |
| 6,606,542 B2 | 8/2003 | Hauwiller et al. | | 2007/0285308 A1 | 12/2007 | Bauregger et al. |
| 6,611,228 B2 | 8/2003 | Toda et al. | | 2008/0129586 A1 | 6/2008 | Martin |
| 6,611,754 B2 | 8/2003 | Klein | | 2008/0204312 A1 | 8/2008 | Euler |
| 6,611,755 B1 | 8/2003 | Coffee et al. | | 2009/0171583 A1 | 7/2009 | DiEsposti |
| 6,622,091 B2 | 9/2003 | Perlmutter et al. | | 2009/0174597 A1 | 7/2009 | DiLellio et al. |
| 6,631,394 B1 | 10/2003 | Ronkka et al. | | 2009/0174622 A1 | 7/2009 | Kanou |
| 6,631,916 B1 | 10/2003 | Miller | | 2009/0177395 A1 | 7/2009 | Stelpstra |
| 6,643,576 B1 | 11/2003 | O'Connor et al. | | 2009/0177399 A1 | 7/2009 | Park et al. |
| 6,646,603 B2 | 11/2003 | Dooley et al. | | 2009/0259397 A1 | 10/2009 | Stanton |
| 6,657,875 B1 | 12/2003 | Zeng et al. | | 2009/0259707 A1 | 10/2009 | Martin et al. |
| 6,671,587 B2 | 12/2003 | Hrovat et al. | | 2009/0262014 A1 | 10/2009 | DiEsposti |
| 6,686,878 B1 | 2/2004 | Lange | | 2009/0262018 A1 | 10/2009 | Vasilyev et al. |
| 6,688,403 B2 | 2/2004 | Bernhardt et al. | | 2009/0262974 A1 | 10/2009 | Lithopoulos |
| 6,703,973 B1 | 3/2004 | Nichols | | 2009/0265054 A1 | 10/2009 | Basnayake |
| 6,711,501 B2 | 3/2004 | McClure et al. | | 2009/0265101 A1 | 10/2009 | Jow |
| 6,721,638 B2 | 4/2004 | Zeitler | | 2009/0265104 A1 | 10/2009 | Shroff |
| 6,732,024 B2 | 5/2004 | Wilhelm Rekow et al. | | 2009/0273372 A1 | 11/2009 | Brenner |
| 6,744,404 B1 | 6/2004 | Whitehead et al. | | 2009/0273513 A1 | 11/2009 | Huang |
| 6,754,584 B2 | 6/2004 | Pinto et al. | | 2009/0274079 A1 | 11/2009 | Bhatia et al. |
| 6,774,843 B2 | 8/2004 | Takahashi | | 2009/0274113 A1 | 11/2009 | Katz |
| 6,792,380 B2 | 9/2004 | Toda | | 2009/0276155 A1 | 11/2009 | Jeerage et al. |
| 6,819,269 B2 | 11/2004 | Flick | | 2009/0295633 A1 | 12/2009 | Pinto et al. |
| 6,822,314 B2 | 11/2004 | Beasom | | 2009/0295634 A1 | 12/2009 | Yu et al. |
| 6,865,465 B2 | 3/2005 | McClure | | 2009/0299550 A1 | 12/2009 | Baker |
| 6,865,484 B2 | 3/2005 | Miyasaka et al. | | 2009/0322597 A1 | 12/2009 | Medina Herrero et al. |
| 6,879,283 B1 | 4/2005 | Bird et al. | | 2009/0322598 A1 | 12/2009 | Fly et al. |
| 6,900,992 B2 | 5/2005 | Kelly et al. | | 2009/0322600 A1 | 12/2009 | Whitehead et al. |
| 6,922,635 B2 | 7/2005 | Rorabaugh | | 2009/0322601 A1 | 12/2009 | Ladd et al. |
| 6,931,233 B1 | 8/2005 | Tso et al. | | 2009/0322606 A1 | 12/2009 | Gronemeyer |
| 6,961,018 B2 | 11/2005 | Heppe et al. | | 2009/0326809 A1 | 12/2009 | Colley et al. |
| 6,967,538 B2 | 11/2005 | Woo | | 2010/0013703 A1 | 1/2010 | Tekawy et al. |
| 6,990,399 B2 | 1/2006 | Hrazdera et al. | | 2010/0026569 A1 | 2/2010 | Amidi |
| 7,006,032 B2 | 2/2006 | King et al. | | 2010/0030470 A1 | 2/2010 | Wang et al. |

| | | | |
|---|---|---|---|
| 2010/0039316 A1 | 2/2010 | Gronemeyer et al. |
| 2010/0039318 A1 | 2/2010 | Kmiecik et al. |
| 2010/0039320 A1 | 2/2010 | Boyer et al. |
| 2010/0039321 A1 | 2/2010 | Abraham |
| 2010/0060518 A1 | 3/2010 | Bar-Sever et al. |
| 2010/0063649 A1 | 3/2010 | Wu et al. |
| 2010/0084147 A1 | 4/2010 | Aral |
| 2010/0085249 A1 | 4/2010 | Ferguson et al. |
| 2010/0085253 A1 | 4/2010 | Ferguson et al. |
| 2010/0103033 A1 | 4/2010 | Roh |
| 2010/0103034 A1 | 4/2010 | Tobe et al. |
| 2010/0103038 A1 | 4/2010 | Yeh et al. |
| 2010/0103040 A1 | 4/2010 | Broadbent |
| 2010/0106414 A1 | 4/2010 | Whitehead |
| 2010/0106445 A1 | 4/2010 | Kondoh |
| 2010/0109944 A1 | 5/2010 | Whitehead et al. |
| 2010/0109945 A1 | 5/2010 | Roh |
| 2010/0109947 A1 | 5/2010 | Rintanen |
| 2010/0109948 A1 | 5/2010 | Razoumov et al. |
| 2010/0109950 A1 | 5/2010 | Roh |
| 2010/0111372 A1 | 5/2010 | Zheng et al. |
| 2010/0114483 A1 | 5/2010 | Heo et al. |
| 2010/0117894 A1 | 5/2010 | Velde et al. |
| 2010/0117899 A1 | 5/2010 | Papadimitratos et al. |
| 2010/0117900 A1 | 5/2010 | van Diggelen et al. |
| 2010/0121577 A1 | 5/2010 | Zhang et al. |
| 2010/0124210 A1 | 5/2010 | Lo |
| 2010/0124212 A1 | 5/2010 | Lo |
| 2010/0134354 A1 | 6/2010 | Lennen |
| 2010/0149025 A1 | 6/2010 | Meyers et al. |
| 2010/0149030 A1 | 6/2010 | Verma et al. |
| 2010/0149033 A1 | 6/2010 | Abraham |
| 2010/0149034 A1 | 6/2010 | Chen |
| 2010/0149037 A1 | 6/2010 | Cho |
| 2010/0150284 A1 | 6/2010 | Fielder et al. |
| 2010/0152949 A1 | 6/2010 | Nunan et al. |
| 2010/0156709 A1 | 6/2010 | Zhang et al. |
| 2010/0156712 A1 | 6/2010 | Pisz et al. |
| 2010/0156718 A1 | 6/2010 | Chen |
| 2010/0159943 A1 | 6/2010 | Salmon |
| 2010/0161179 A1 | 6/2010 | McClure et al. |
| 2010/0161211 A1 | 6/2010 | Chang |
| 2010/0161568 A1 | 6/2010 | Xiao |
| 2010/0171660 A1 | 7/2010 | Shyr et al. |
| 2010/0171757 A1 | 7/2010 | Melamed |
| 2010/0185364 A1 | 7/2010 | McClure |
| 2010/0185366 A1 | 7/2010 | Heiniger et al. |
| 2010/0185389 A1 | 7/2010 | Woodard |
| 2010/0188285 A1 | 7/2010 | Collins |
| 2010/0188286 A1 | 7/2010 | Bickerstaff et al. |
| 2010/0189163 A1 | 7/2010 | Burgi et al. |
| 2010/0207811 A1 | 8/2010 | Lackey |
| 2010/0210206 A1 | 8/2010 | Young |
| 2010/0211248 A1 | 8/2010 | Craig et al. |
| 2010/0211315 A1 | 8/2010 | Toda |
| 2010/0211316 A1 | 8/2010 | DaSilva |
| 2010/0220004 A1 | 9/2010 | Malkos et al. |
| 2010/0220008 A1 | 9/2010 | Conover et al. |
| 2010/0222076 A1 | 9/2010 | Poon et al. |
| 2010/0225537 A1 | 9/2010 | Abraham |
| 2010/0228408 A1 | 9/2010 | Ford |
| 2010/0228480 A1 | 9/2010 | Lithgow et al. |
| 2010/0231443 A1 | 9/2010 | Whitehead |
| 2010/0231446 A1 | 9/2010 | Marshall et al. |
| 2010/0232351 A1 | 9/2010 | Chansarkar et al. |
| 2010/0235093 A1 | 9/2010 | Chang |
| 2010/0238976 A1 | 9/2010 | Young |
| 2010/0241347 A1 | 9/2010 | King et al. |
| 2010/0241353 A1 | 9/2010 | Park |
| 2010/0241441 A1 | 9/2010 | Page et al. |
| 2010/0241864 A1 | 9/2010 | Kelley et al. |

FOREIGN PATENT DOCUMENTS

| | | |
|---|---|---|
| WO | WO9836288 | 8/1998 |
| WO | WO0024239 | 5/2000 |
| WO | WO03019430 | 3/2003 |
| WO | WO2005/119386 | 12/2005 |
| WO | WO2009/066183 | 5/2009 |
| WO | WO-2009082745 | 7/2009 |
| WO | WO2009126587 | 10/2009 |
| WO | WO2009/148638 | 12/2009 |
| WO | WO-2010005945 | 1/2010 |
| WO | WO-2010/042131 | 4/2010 |
| WO | WO-2010104782 | 9/2010 |
| WO | WO-2011014431 | 2/2011 |

OTHER PUBLICATIONS

"Notification Concerning Transmittal of International Report on Patentability (PCT)", PCT/US2009/049776, (Jan. 20, 2011).

"Notification of Transmittal of InternatinalPrelim. Report of Patentability", International Application No. PCT/US09/039686, (Oct. 21, 2010).

"International Search Report and Written Opinion", PCT/US2010/043094, (Sep. 17, 2010).

"Notification of Publication of International Application", WO 2011/014431, (Feb. 3, 2011).

"International Search Report and Written Opinion", PCT/US08/81727, (Dec. 23, 2008).

"International Preliminary Report on Patentability", PCT/US2009/034376, (Nov. 2, 2009), 1-6.

Parkinson, Bradford W., et al., "Global Positioning System: Theory and Applications, vol. II", Bradford W. Parkinson and James J. Spiker, Jr., eds., *Global Postioning System: Theory and Applicaitons*, vol. II, 1995, AIAA, Reston, VA, USA, pp. 3-50, (1995), 3-50.

"Orthman Manufacturing Co., www.orthman.com/htm;guidance.htm", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers vol. 1*, Monetrey, California American Institute of Aeronautics and Astronautics, Inc., (May 2004),136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware* (EH'02), (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.

Park, Chansik et al., "Integer Ambiguity Resolution for GPS Based Attitude Determination System", *SICE* 1998, Jul. 29-31, Chiba, 1115-1120.

Last, J. D., et al., "Effect of skywave interference on coverage of radiobeacon DGPS stations", *IEEE Proc.-Radar, Sonar Navig.*, vol. 144, No. 3, Jun. 1997, pp. 163-168.

"International Search Report and Written Opinion", PCT/US2004/015678, filed May 17, 2004, Jun. 21, 2005.

"ISO", *11783 Part 7 Draft Amendment 1 Annex*, Paragraphs B.6 and B.7.ISO 11783-7 2004 DAM1, ISO: Mar. 8, 2004.

Kaplan, E D., "Understanding GPS: Principles and Applicaitons", *Artech House*, MA, 1996.

Irsigler, M et al., "PPL Tracking Performance in the Presence of Oscillator Phase Noise", *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 783-795, 1998.

Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.

"International Search Report and Written Opinion", *International Searching Authortiy*, PCT/US08/88070, Feb. 9, 2009.

Keicher, R. et al., "Automatic Guidance for Agricultural Vehicles in Europe", *Computers and Electronics in Agriculture*, vol. 25, (Jan. 2000),169-194.

Takac, Frank et al., "SmartRTK: A Novel Method of Processing Standardised RTCM Network RTK Information for High Precision Positioning", *Proceedings of ENC GNSS 2008*, Toulouse, France,(Apr. 22, 2008).

"International Search Report", PCT/US09/33567, (Feb. 9, 2009).

"International Search Report", PCT/US09/49776, (Aug. 11, 2009).

"International Search Report", PCT/AU/2008/000002, (Feb. 28, 2008).

"International Search Report and Written Opinion", PCT/IB2008/003796 (Jul. 15, 2009).

"International Search Report", PCT/US09/33693, (Mar. 30, 2009).

"International Search Report", PCT/US09/039686, (May 26, 2009).

"International Search Report", PCT/US09/34376, (Nov. 2, 2009).

"International Search Report / Written Opinion", PCT/US09/63594, (Jan. 11, 2010).

"International Search Report", PCT/US09/60668, (Dec. 9, 2009).

"International Search Report", PCT/US09/067693, (Jan. 26, 2010).

"International Search Report and Written Opinion", PCT/US10/21334, (Mar. 12, 2010).

Rho, Hyundho et al., "Dual-Frequency GPS Precise Point Positioning with WADGPS Corrections", [retrieved on May 18, 2010]. Retrieved from the Internet: ,URL: http://gauss.gge.unb.ca/papers.pdf/iongnss2005.rho.wadgps.pdf, (Jul. 12, 2006).

"Eurocontrol, Pegasus Technical Notes on SBAS", report [online], Dec. 7, 2004 [retrieved on May 18, 2010]. Retrieved from the Internet: <URL:http://www.icao.int/icao/en/ro/nacc/meetings/2004/gnss/documentation/Pegasus/tn.pdf>, (Dec. 7, 2004),p. 89 paras [0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004),p. 168 para [0001].

Schaer, et al., "Determination and Use of GPS Differential Code Bias Values", *Presentation* [online]. Revtrieved May 18, 2010. Retrieved from the internet: <http://nng.esoc.esa.de/ws2006/REPR2.pdf>., (May 8, 2006).

"International Search Report", PCT/US10/26509., (Apr. 20, 2010).

* cited by examiner

Dual-f Complex (Quadrature)

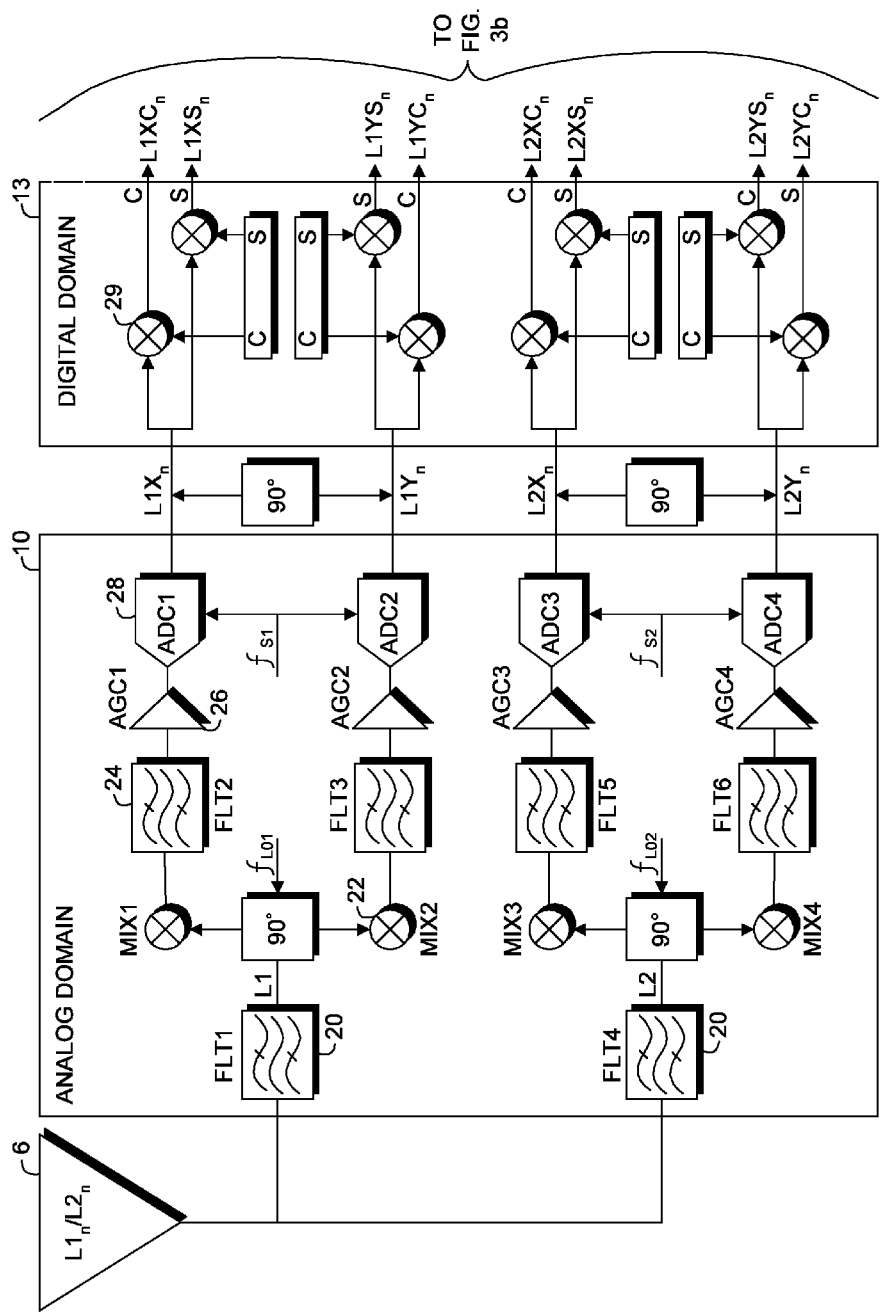

CROSS-WIPING
SIGNAL COMBINER

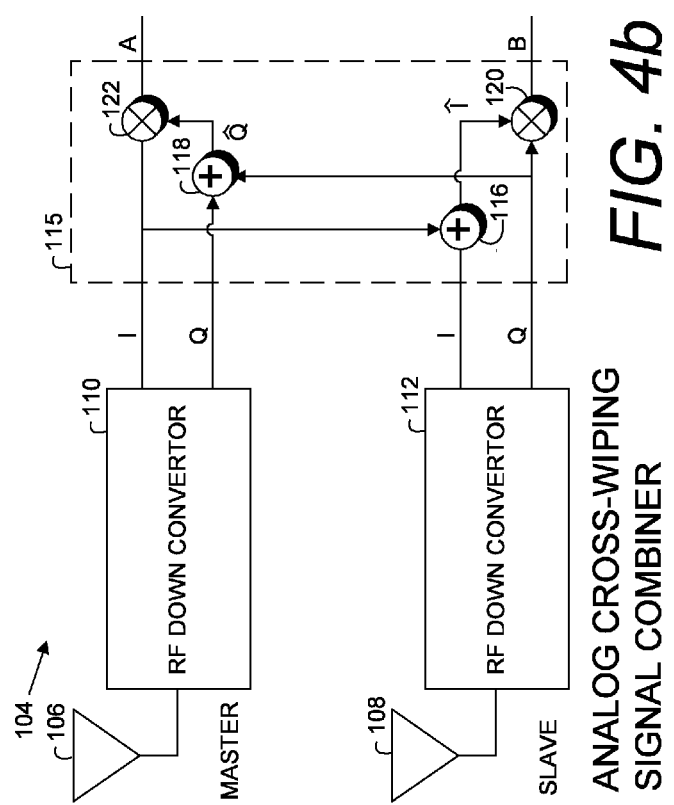

DIGITAL CROSS-WIPING SIGNAL COMBINER

2 Ant (Vector) Dual-f Real

MULTI-FREQUENCY GNSS RECEIVER BASEBAND DSP

CROSS-REFERENCE TO RELATED APPLICATION

This application claims priority in U.S. Provisional Patent Application No. 61/240,098, filed Sep. 4, 2009, which is incorporated herein by reference.

BACKGROUND OF THE INVENTION

1. The Field of the Invention

The present invention relates generally to global navigation satellite system (GNSS) receiver technology, and in particular to a cross-wiping baseband digital signal processing (DSP) component for a multi-frequency GNSS receiver.

2. GNSS Background

Global navigation satellite systems (GNSS) include the Global Positioning System (GPS), which was established by the United States government and employs a constellation of 24 or more satellites in well-defined orbits at an altitude of approximately 26,500 km. These satellites are positioned in six different orbital planes such that at any time a minimum of six and a maximum of eleven satellites are visible to any user on the surface of the Earth, except in the Polar Regions. The satellites operate in nearly circular orbits at an inclination angle of 55 degrees and with approximately a 12-hour period. Each satellite contains at least one atomic clock and transmits a navigation message that contains an accurate system time and its orbital position referenced to the atomic clock. The navigation message also contains clock behavior, status messages, and correction data such as ionospheric delay, time offset, etc. An almanac that gives the approximate data for each active satellite is also provided.

These satellites continually transmit microwave L-band radio signals in two frequency bands, centered at 1575.42 MHz and 1227.60 MHz, denoted as L1 and L2 respectively. These signals include timing patterns relative to the satellite's onboard precision clock (which is kept synchronized by a ground station) as well as a navigation message giving the precise orbital positions of the satellites. GPS receivers process the radio signals, computing ranges to the GPS satellites, and by triangulating these ranges, the GPS receiver determines its position and its internal clock error. Different levels of accuracy can be achieved depending on the techniques employed.

GNSS also includes Galileo (Europe), the Global'naya Navigatsionnaya Sputnikovaya Sistema (GLONASS, Russia), Beidou (China), Compass (proposed), the Indian Regional Navigational Satellite System (IRNSS) and QZSS (Japan, proposed).

To gain a better understanding of the accuracy levels achievable by using GNSS, it is necessary to understand the two types of signals available from the GNSS satellites. The first type of signal includes both the coarse acquisition (C/A) code, which modulates the L1 radio signal, and the precision (P) code, which modulates both the L1 and L2 radio signals. These are pseudorandom digital codes that provide a known pattern that can be compared to the receiver's version of that pattern. By measuring the time-shift required to align the pseudorandom digital codes, the GNSS receiver is able to compute an unambiguous pseudo-range to the satellite. Both the C/A and P codes have a relatively long "wavelength," of about 300 meters (1 microsecond) and 30 meters (1/10 microsecond), respectively. Consequently, use of the C/A code and the P code yield position data only at a relatively coarse level of resolution.

The second type of signal utilized for position determination is the carrier signal. The term "carrier," as used herein, refers to the dominant spectral component which remains in the radio signal after the spectral content caused by the modulated pseudorandom digital codes (C/A and P) is removed. The L1 and L2 carrier signals have wavelengths of about 19 and 24 centimeters, respectively. The GNSS receiver is able to "track" these carrier signals, and in doing so, make measurements of the carrier phase to a small fraction of a complete wavelength, permitting range measurement to an accuracy of less than a centimeter.

In stand-alone GNSS systems that determine a receiver's position coordinates without reference to a nearby reference receiver, the process of position determination is subject to errors from a number of sources. These include errors in the satellite's clock reference, the location of the orbiting satellite, ionospheric-induced propagation delay errors, and tropospheric refraction errors. A more detailed discussion of these sources of error is provided in U.S. Pat. No. 5,828,336 by Yunck, et al. Multiple GNSS tracking devices can be synchronized in a geo-location system using the system and method disclosed in Miller, Badke and Whitehead U.S. Pat. No. 7,292,186, which is assigned to a common assignee and is incorporated herein by reference.

To overcome the errors of stand-alone GNSS, many kinematic positioning applications make use of multiple GNSS receivers. A reference receiver located at a reference site having known coordinates receives the satellite signals simultaneously with the receipt of signals by a remote receiver. Depending on the separation distance, many of the errors mentioned above will affect the satellite signals equally for the two receivers. By taking the difference between signals received both at the reference site and at the remote location, these errors are effectively eliminated. This facilitates an accurate determination of the remote receiver's coordinates relative to the reference receiver's coordinates. The technique of differencing signals is known in the art as differential GNSS (DGNSS). The combination of DGNSS with precise measurements of carrier phase leads to position accuracies of less than one centimeter root-mean-squared (centimeter-level positioning). When DGNSS positioning utilizing carrier phase is done in real-time while the remote receiver is potentially in motion, it is often referred to as Real-Time Kinematic (RTK) positioning.

One of the difficulties in performing RTK positioning using carrier signals is the existence of an inherent ambiguity that arises because each cycle of the carrier signal looks exactly alike. Therefore, a range measurement based upon carrier phase has an ambiguity equivalent to an integral number of carrier signal wavelengths. Various techniques are used to resolve the ambiguity, often with some form of double-differencing. The prior art related to this includes U.S. Pat. No. 4,170,776 by MacDoran, U.S. Pat. No. 4,667,203 by Counselman, U.S. Pat. No. 4,963,889 by Hatch, U.S. Pat. No. 5,296,861 by Knight, and U.S. Pat. No. 5,519,620 by Talbot et al. Once ambiguities are solved, however, the receiver continues to apply a constant ambiguity correction to a carrier measurement until loss of lock on that carrier signal. Regardless of the technique employed, the problem of solving integer ambiguities, in real-time, is always faster and more robust if there are more measurements upon which to discriminate the true integer ambiguities. Robust means that there is less chance of choosing an incorrect set of ambiguities. The degree to which the carrier measurements collectively agree to a common location of the GNSS receiver is used as a discriminator in choosing the correct set of ambiguities. The more carrier phase measurements that are available, the more likely it is that the best measure of agreement will correspond to the true (relative to the reference GNSS) position of the remote GNSS receiver.

One method, which effectively gives more measurements, is to use dual frequency (DF) receivers for tracking delta-range measurements from P code modulation on the L1 and L2 carriers simultaneously with the L1 C/A code generating code phase measurements. The L1 and L2 carriers are modulated with codes that leave the GNSS satellite at the same time. Since the ionosphere produces different delays for radio carriers of different frequencies, such dual frequency receivers can be used to obtain real-time measurements of ionospheric delays at various receiver positions. The L1 and L2 ranging measurements are combined to create a new L1 ranging measurement that has an ionospheric delay of the same sign as the ionosphere delay in the L1 pseudorange. Accurate ionospheric delay information, when used in a position solution, can help produce more accuracy. Absent such real-time ionospheric delay measurements, other correction techniques are commonly used, such as differential GNSS (DGNSS), proprietary third party satellite augmentation system (SAS) services available on a paid subscription basis, the U.S.-sponsored Wide Area Augmentation System (WAAS) and local area augmentation systems (LAASs).

As compared to single-frequency (typically L1) receiver systems, previous dual-frequency receiver systems have tended to be relatively expensive because of their additional components for accommodating L2 measurements. Moreover, the additional components tended to consume more power and required additional space. Still further, dual-frequency receivers should be adaptable for use with all present and projected GNSS, which cover a "superband" of radio signal frequencies generally in the range of about 1.2 to 1.7 GHz. Accordingly, a preferred broadband DSP for a multi-frequency receiver should be: a single, application-specific integrated circuit (ASIC); programmable for various frequencies; adapted for cross-wiping the multiple output signal components; minimally-sized; and capable of operating with minimal power.

SUMMARY OF THE INVENTION

In the practice of an aspect of the present invention, a baseband digital signal processor (DSP) is provided for a multi-frequency GNSS receiver system. The multiple outputs (corresponding to multiple frequencies) of the down converter are cross-wiped by cross-correlating signal components, e.g. I (real) and Q (imaginary) in a quadrature configuration, thereby canceling noise. Various present and future GNSS protocols can thus be accommodated.

BRIEF DESCRIPTION OF THE DRAWINGS

FIGS. 3a-b show a schematic diagram of the components of a portion of the system;

FIG. 4b is a schematic diagram showing an analog aspect of the cross-wiping signal combiner;

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning.

Global navigation satellite systems (GNSSs) are broadly defined to include the Global Positioning System (GPS, U.S.), Galileo (proposed, Europe), GLONASS (Russia), Beidou (China), Compass (proposed), the Indian Regional Navigational Satellite System (IRNSS), QZSS (Japan, proposed) and other current and future positioning technology using signals from satellites, with or without augmentation from terrestrial sources.

The following table provides an example of GNSS frequency superband channel allocations, which could be implemented with a GNSS receiver system 4 including a cross-correlating baseband DSP 15 embodying an aspect of the present invention:

TABLE 1

System Center Frequencies and Bandwidth Requirements

| ID | System | $F_{center}$ (MHz) | Bandwidth (MHz) |
|---|---|---|---|
| 1 | GPS(L1CA) | 1575.42 | 24.0 |
| 2 | GPS(L1C) | 1575.42 | 24.0 |
| 2 | GPS(L1P) | 1575.42 | 24.0 |
| 3 | GPS(L2P) | 1227.6 | 24.0 |
| 4 | GPS(L2C) | 1227.6 | 24.0 |
| 5 | GPS(L5) | 1176.45 | 24.0 |
| 6 | GLONASS(L1) | 1602.0 | 16 |
| 7 | GLONASS(L2) | 1246.0 | 16 |
| 8 | Galileo(E1) | 1575.42 | 24.0 |
| 9 | Galileo(E5a) | 1176.45 | 24.0 |
| 10 | Galileo(E5ab) | 1191.795 | 51.15 |

Figure 1:
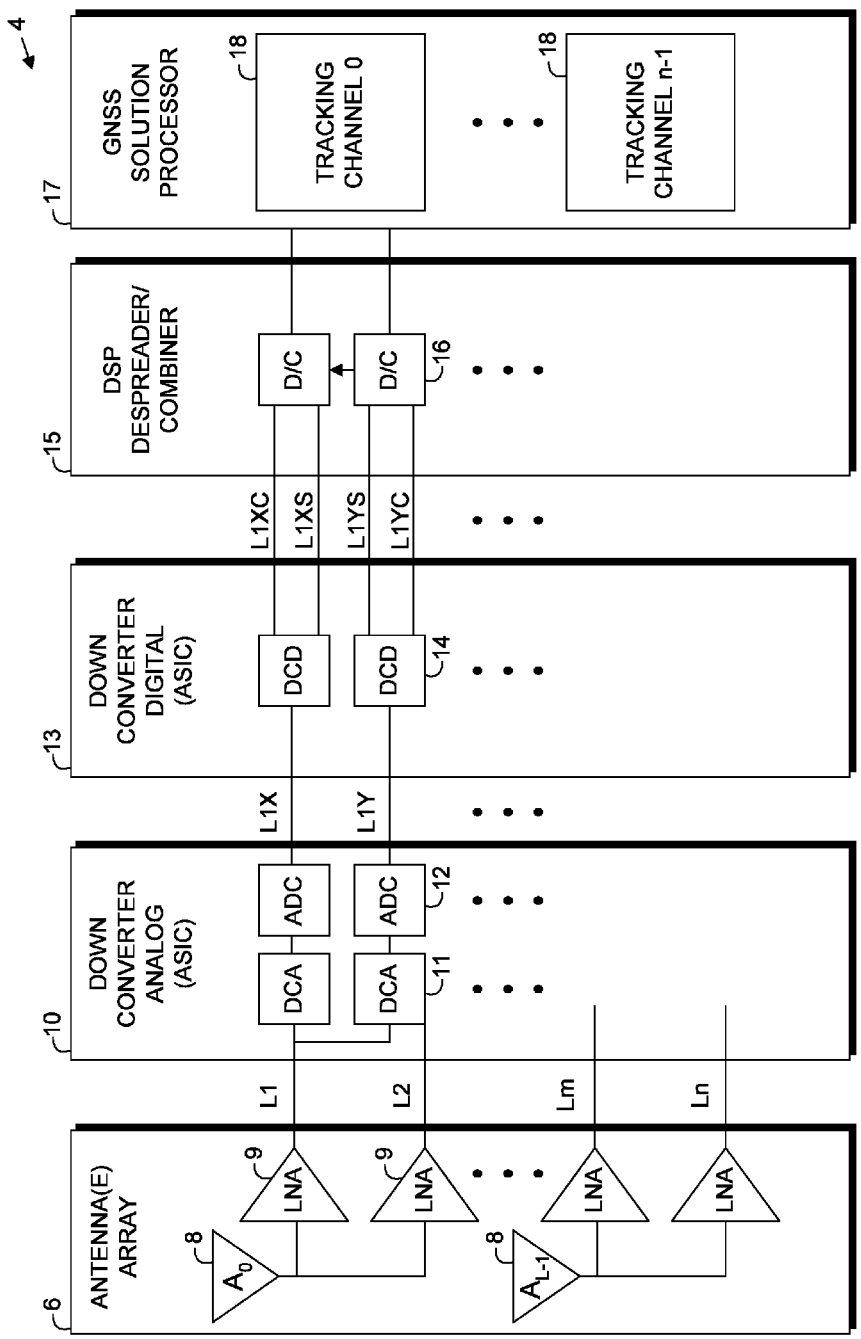
FIG. 1 is a diagram of a multi-frequency GNSS receiver system with a baseband DSP cross-wiping correlator embodying an aspect of the present invention.

Without limitation on the generality of useful applications of the broadband DSP 15, a dual-frequency GNSS receiver system designated 4 is shown in FIG. 1 as an example of an application in which the present invention can be utilized. Such GNSS receiver systems can be employed in a wide range of useful applications, such as navigation, guidance and machine control in various industries, including precision farming, crop dusting, marine navigation, shipping, transportation, mining and manufacturing.

The receiver system 4 includes an antenna subsystem 6, which preferably comprises an array of active antennas ($A_0$-$A_{L-1}$) 8 connected to low noise amplifiers (LNAs) 9, although passive antennas could also be employed and tuned to specific GNSS frequencies, such as L1, L2, L5, etc. The antenna subsystem 6 produces GNSS signals, which are input to a radio frequency, down converter analog, application-specific integrated circuit (RF DCA ASIC, or ASIC) 10 with multi-frequency down conversion, which is the subject of U.S. patent application Ser. No. 12/635,527, which is incorporated herein by reference. The down converter ASIC 10 can be configured with multiple frequency channel DCAs 11 (e.g., L1, L2 . . . Lm, Ln) driven by a common local oscillator/synthesizer (LO/Synth) and synchronized ADC clocks. The analog output of the DCAs 11 is digitized in ADCs 12. Alternatively, the analog down converter ASIC 10 can be eliminated and replaced by an ADC system with technology used in connection with software-defined radios (SDRs).

External matching components, including bandwidth filters, maximize performance and accommodate frequencies in the superband for compatibility with all GNSS, including various combinations of ranging signal frequencies.

In addition to accommodating multiple frequencies, the ASIC 10 can separate the real (I) and imaginary (Q) parts of signals into corresponding outputs such as L1X and L1Y respectively, which are derived from L1 frequency GNSS signals.

The output of the analog ASIC 10 provides input to a digital ASIC 13, which can also comprise an application-specific integrated circuit comprising multiple down converter digital (DCD) components 14. As shown, the DCDs 14 convert incoming signals into L1XC (cosin) and L1XS (sin) components. For example, L1XC can comprise the coarse acquisition (CA) L1 signal and L1XS can comprise the precision L1 signal. The ASICs 10, 13 could be combined onto a single ASIC or, conversely, their components could be separated into multiple individual ICs.

The output of the digital ASIC 13 is received by a cross-correlating baseband digital signal processor (DSP) despreader/combiner 15, including individual despreader/combiner components 16, which provide input to a GNSS solution processor 17 including tracking channels 18 (e.g., 0-(n−1)). The solution processor 17 can be connected to other components, such as graphical user interfaces (GUI), autosteering, etc. Still further, satellite augmentation systems (SAS) of various types, including free services such as the Wide Area Augmentation System (WAAS) and paid subscription services such as Omnistar can be used for enhancing the accuracy of the system 4 by providing GNSS correction signals.

The receiver system 4 can utilize direct sequence spread spectrum (DSSS), which is a modulation technique where a pseudorandom noise sequence directly phase modulates a data-modulated carrier. The DSSS signal has a noise-like spectrum. For example, each GPS satellite transmits on two L-band frequencies: L1=1575.42 MHz and L2=1227.60 MHz. Three sets of pseudorandom noise (PRN) ranging codes are in use: the L1 coarse/acquisition (L1C/A) code, the L1 precision (L1P) code and the L2P code. The C/A code set, also known as the "Gold Code," has a 1.023 MHz chip rate, with "chip" referring to a single bit of a pseudorandom sequence (PRN-sequence) and the term "chip rate" referring to the rate at which bits of PRN-sequences are shifted. The Gold Code therefore has a length of 1023. The term "code" refers to the binary bit stream (the pseudorandom sequence) used to spread a signal over a wide range of frequencies for transmission. This spreading improves the accuracy of position estimation. Other advantages include interference rejection and low spectral power density, i.e. the power level at a given frequency.

Figure 2:
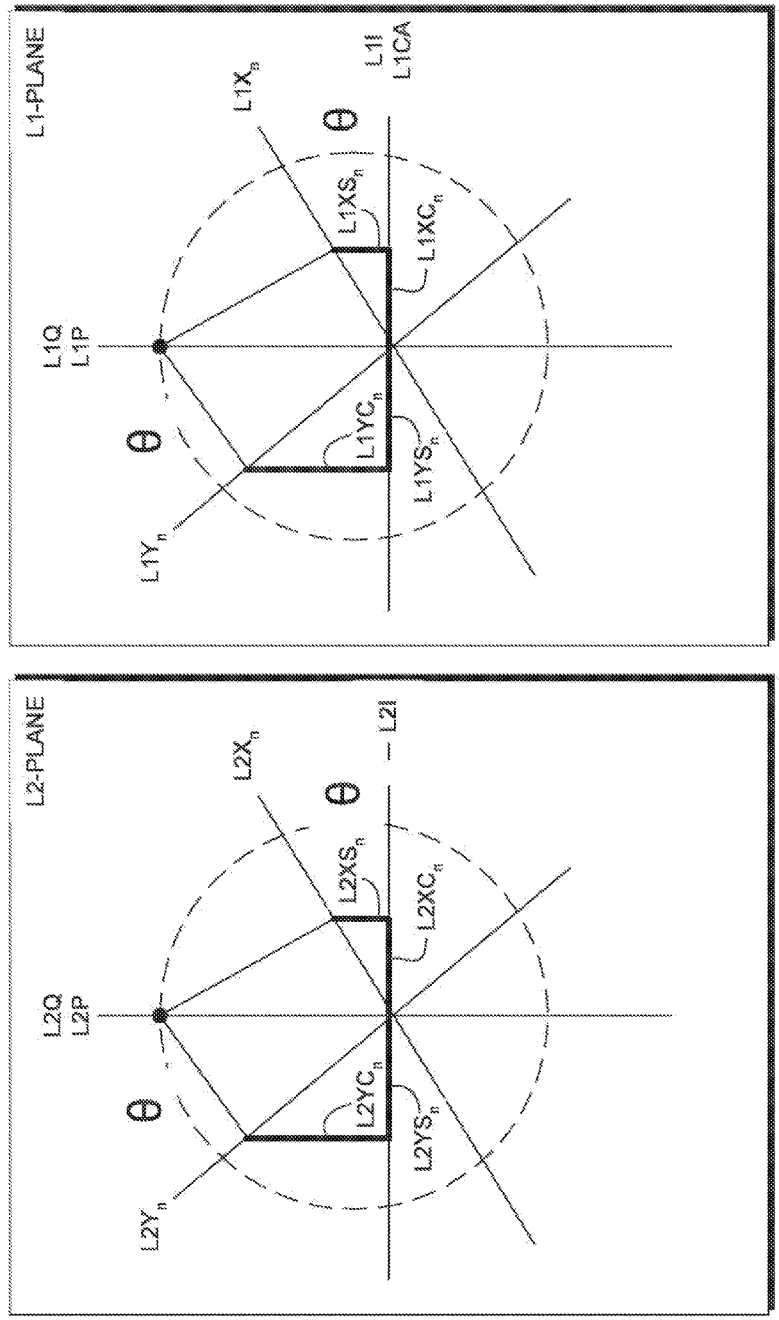
FIG. 2 is a signal rotation diagram for L1 and L2 signals in a dual frequency, complex, quadrature system for GPS L1/L2.

FIG. 2 shows a dual-frequency complex (quadrature) signal diagram for the L1 and L2 planes. L1Xn, L1Yn and L2Xn, L2Yn represent the L1, L2 analog signals respectively from the analog down converter ASIC 10. Other signal configurations, such as dual frequency real (FIG. 5), can also be cross-wiped using the DSP of the present invention. These signals are multiplied by sin and cosine terms in the digital domain ASIC 13 to obtain the digital truth terms L1I, L1CA (X-axis) and L1Q, L1P (Y-axis) in the L1 plane. In the L2 plane the corresponding digital truth terms are L2I, L2C (X-axis) and L2Q, L2P (Y-axis). In both cases the angle θ represents an angle of rotation for phase coherency in the digital domain.

Figure 3B:
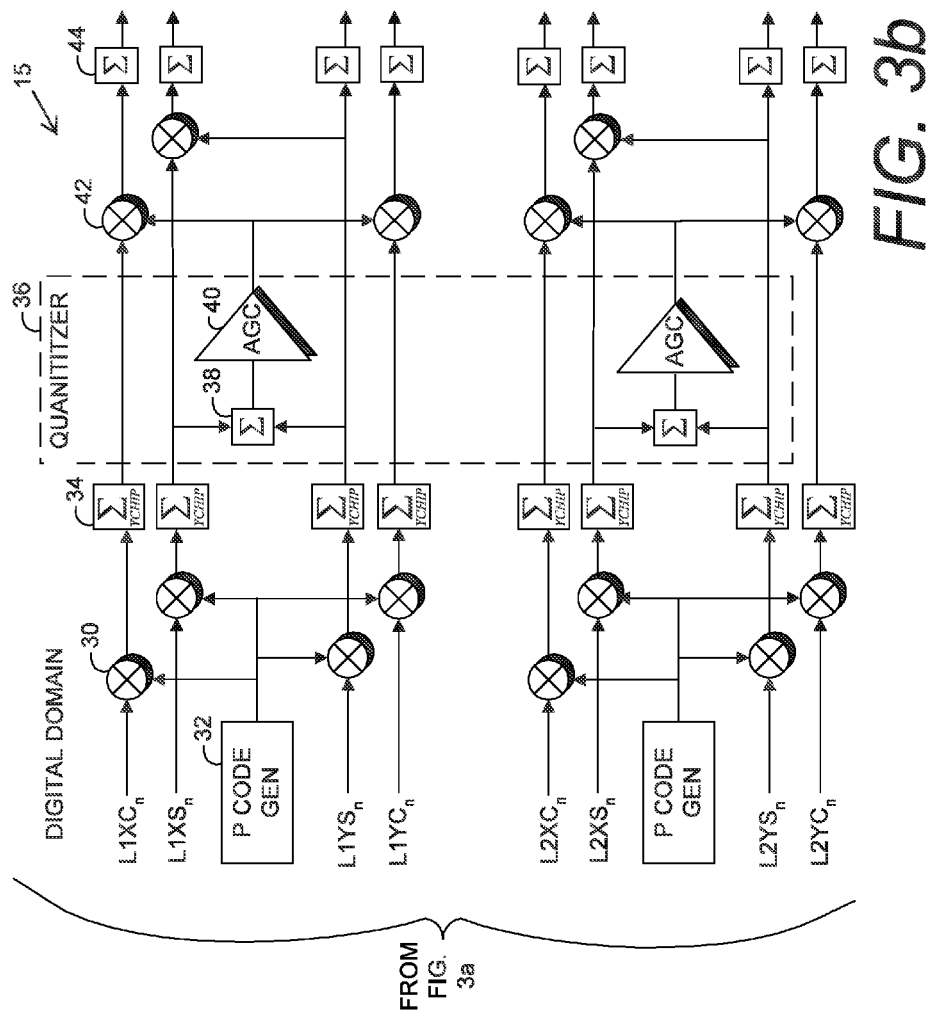

FIG. 3a shows a schematic diagram of dual frequency complex sampling analogue and digital ASICs 10, 13 respectively, the output of which provides input to the DSP despreader/combiner 15, as shown in FIG. 3b. The analog ASIC 10 produces an estimate of the rotation (FIG. 2) for the quadrature split. The analog ASIC 10 includes filters 20 connected to the antennas 6 and providing output to mixers 22, wherein signals are rotated 90°. Filters 24 receive the output from the mixers 22 and are connected to automatic gain control (AGC) op amps 26, which in turn are connected to analog-to-digital converters (ADCs) 28, from which digitized signals $L1X_n$, $L1Y_n$, $L2X_n$, $L2Y_n$ are output from the analog ASIC 10 to mixers 29 in the digital ASIC 13, which receive cosin (C) and sin(S) inputs, resulting in outputs $L1XC_n$, $L1XS_n$, $L1YS_n$, $L1YC_n$, $L2XC_n$, $L2XS_n$, $L2YS_n$ and $L2YC_n$, from FIG. 3a to FIG. 3b as shown.

In the DSP despreader/combiner 15 the input signals are input to mixers 30 wherein signals from P code generators 32 strip out the P code. The signals are input to summers 34 and the sin components are then input to a quantizer 36 including summers 38, which are connected to automatic gain controllers (AGCs) 40. The cosin signal components are input to mixers 42, which output combined signals to output summers 44.

Figure 4A:
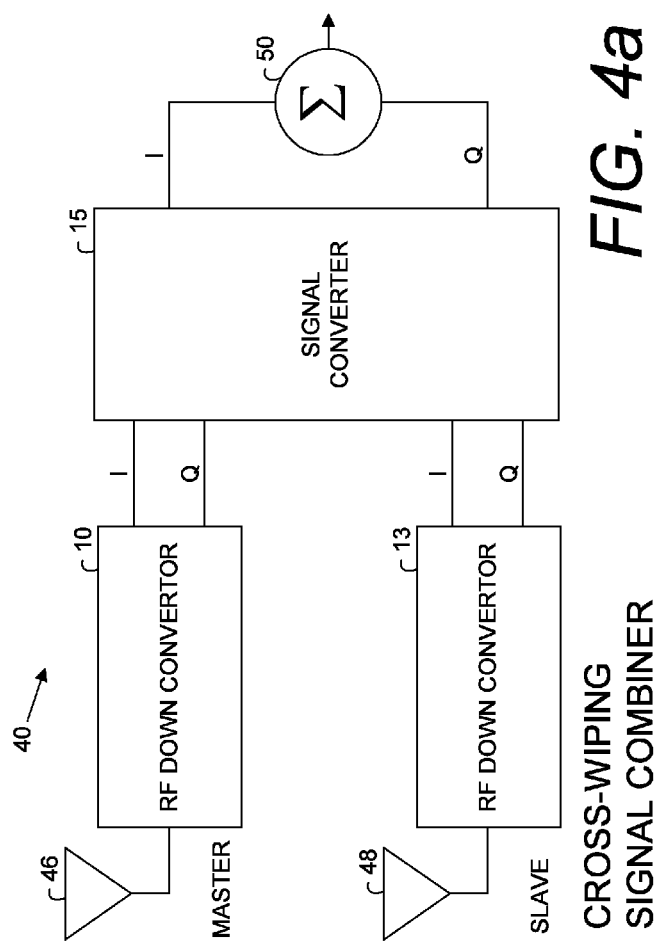
FIG. 4a is a block diagram of the cross-wiping signal combiner.

FIG. 4a shows a general-case application of the DSP despreader/combiner 15 for a GNSS system including a master antenna 46 and a slave antenna 48, which can be associated with, for example: L1/L2; L1/L2/L5; Lm/Ln; etc. From the RF down converters 10/13, the I and Q signal components are input to the DSP despreader/combiner 15 from which I and Q outputs are combined in a summer 50.

FIG. 4b shows a GNSS receiver system 104 comprising an analog alternative aspect of the present invention with discrete RF front end components comprising master and slave antennas 106, 108 connected to master and slave analog units 110, 112, each of which provides I and Q signal components as inputs to a cross-wiping signal combiner 115. The present invention encompasses various combinations of components comprising either discrete components or integrated circuits (ICs), such as the RF front end ASICs described herein.

The analog embodiment cross-wiping signal combiner 115 includes I, Q adders 116, 118 respectively, and mixers 120, 122. The combiner 115 de-spreads high and low frequency signals from the dual frequency RF ASICs 110, 112, the signals of which correspond to L1 and L2 respectively in an exemplary GPS application. These signals are de-spread to the original data bandwidth by correlating them with locally generated PRN-sequences identical to and in synchronization with the PRN-sequences used to spread the carriers at the radio transmitter, e.g., a GPS satellite vehicle (SV). This de-spreading occurs after the signal received at the antennas 106, 108 has been amplified and down-converted by the DCAs 110, 112 to a suitable carrier frequency, also known as the intermediate frequency (IF). The hardware section associated with the amplification, down-conversion, and analog-to-digital conversion (ADC) is designated the radio frequency (RF) stage (i.e. down convertor analog (DCA) ASICs 110, 112 in FIG. 4b). The combiner 15, which processes the RF stage output, and the solution processor 17, which generates the position, velocity, and time information (FIG. 1), are collectively referred to as the baseband (BB) stage.

The sampling rate at the baseband stage can be any multiple of the PRN code rate. A minimum of two samples per chip (bit) is needed for real domain sampling, but only one sample per chip (bit) is needed for quadrature signal sampling. For real sampling, the minimum sampling rate could therefore be 2.046 MHz. The sampled signals are then made available in two channels, one in-phase (I) and the other in-quadrature (Q). The resulting signals are then correlated, i.e. combined, with the locally generated PRN codes. The local code generators are driven by code numerically controlled oscillators (NCOs). The results of the correlations are input to the GNSS solution processor 17 (FIG. 1) and further processed to determine the code and carrier phase offsets. The processor 17 outputs control signals to the code NCOs and the carrier NCOs so that they are in alignment with the input (sampled) signals. When the incoming signals are aligned with the locally generated PRN codes and the carriers, the data bits in the signals can be extracted. The extracted data are used in computing the satellite position and hence the receiver's position, velocity, etc.

The intermediate frequency (IF) inputs from the high (e.g., L1) and low (e.g., L2) sides of the DCA ASICs 110, 112 (FIG. 4b) are multiplied with the local direct digital frequency synthesizer (DDFS) frequency in-phase, which generates the in-phase component I. In another path, the same input is multiplied by the DDFS frequency with a phase shift of 90°, the signal product of which is the quadrature component Q. The DDFS is driven by a carrier numerically controlled oscillator (NCO), which receives the phase and frequency corrections from an outside processor, such as the solution processor 17. Because of this correction, the DDFS frequency and phase are almost the same as those of the IF input. Therefore, the I and Q outputs of the I and Q mixers 120, 122 are stripped or wiped off from the carrier (IF) and the I and Q signals may be subsequently filtered with a low pass filter to remove the high-frequency components. The I and Q signals are then correlated with the PRN-sequences locally generated by the PRN code generators.

The PRN-sequences correspond to the channels/frequencies being processed by the combiner (correlator) 15/115. The PRN-sequence generator frequencies are made equal to the code rates of the I and Q signal components with corrective feedback from the processor 17 to the code NCOs. The code NCOs can also generate other sampling frequencies as needed by the combiner 15/115. The correlation outputs are then sent to the position solution processor 17 (FIG. 1) for further processing of GPS-based position solutions, speed, travel direction, etc. The solution processor 17 can include memory devices for storing information intermediate the components of the systems 4, 104.

It will be appreciated that respective I and Q components of the dual frequencies are input to the adders 116, 118, which add the respective components for I and Q signal outputs, which are input to the mixers 120, 122, which receive the other of the I and Q outputs of the DCA ASICs 110, 112 (FIG. 4b). Hence the dual/multi-frequency correlator performs a "cross-wiping" or de-spreading function on the I and Q signal components for both frequencies. The resulting correlator 15/115 output signals A and B are input to the position solution processor 17 (FIG. 1).

Figure 4C:
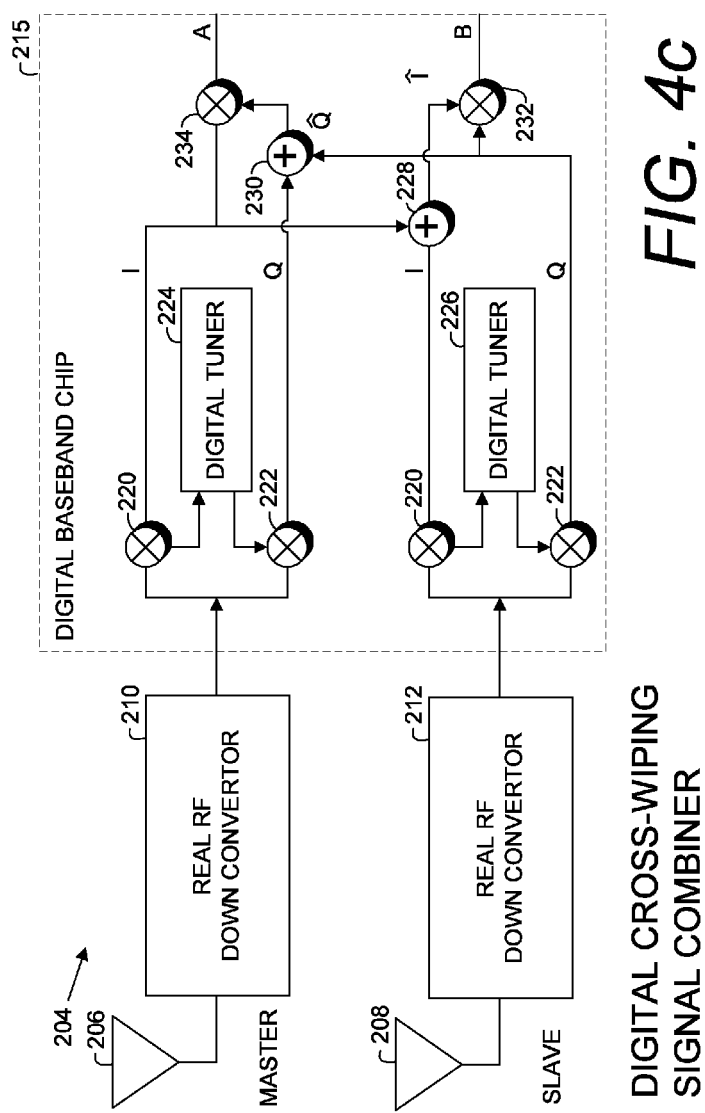
FIG. 4c is a schematic diagram showing a digital aspect of the cross-wiping signal combiner.

FIG. 4c shows another GNSS receiver system 204 comprising a digital alternative aspect of the present invention with discrete RF front end components comprising master and slave antennas 206, 208 connected to master and slave real RF down converter units 210, 212, each of which provides I and Q signal components as inputs to a cross-wiping signal combiner or correlator 215.

The digital embodiment cross-wiping signal combiner 215 includes I, Q mixers 220, 222 and digital tuners 224, 226. The combiner 215 de-spreads high and low frequency signals from the dual frequency RF ASICs 210, 212, the signals of which correspond to L1 and L2 respectively in an exemplary GPS application. These signals are de-spread to the original data bandwidth by correlating them with locally generated PRN-sequences identical to and in synchronization with the PRN-sequences used to spread the carriers at the radio transmitter, e.g., a GPS satellite vehicle (SV). This de-spreading occurs after the signal received at the antennas 206, 208 has been amplified and down-converted by the DCAs 210, 212 to a suitable carrier frequency, also known as the intermediate frequency (IF). The hardware section associated with the amplification, down-conversion, and analog-to-digital conversion (ADC) is designated the radio frequency (RF) stage (i.e. down convertor analog (DCA) ASICs 210, 212 in FIG. 4c).

Respective I and Q components of the dual frequencies are input to the adders 228, 230, which add the respective components for I and Q signal outputs, which are input to the mixers 232, 234, which receive the other of the I and Q outputs of the DCA ASICs 210, 212 (FIG. 4c). Hence the dual/multi-frequency correlator performs a "cross-wiping" or de-spreading function on the I and Q signal components for both frequencies. The resulting correlator 15/115 output signals A and B are input to the position solution processor 17 (FIG. 1).

Figure 5:
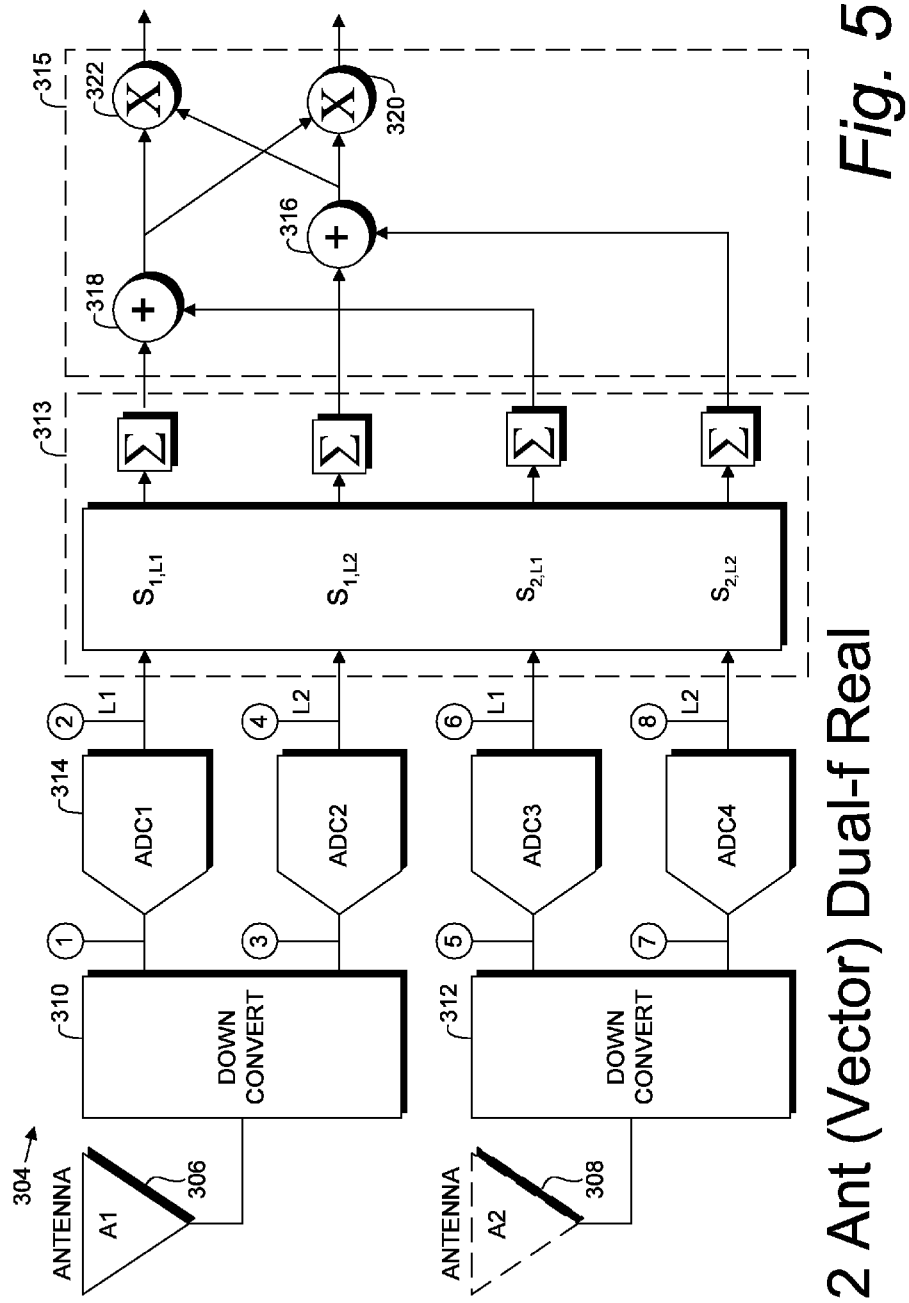
FIG. 5 is a schematic diagram showing a dual-frequency, real signal component aspect of the present invention, including two antennas for vector attitude solutions.

FIG. 5 shows a dual frequency real sampling GNSS receiver system 304 comprising yet another aspect of the present invention and including antennas 306, 308 connected to down converters 310, 312, which provide outputs to ADCs 314. A cross-wiping signal combiner or correlator 315 receives the real signal components as the output of a tuner and correlator 313. The combiner 315 includes adders 316, 318 and mixers 320, 322, all of which function similarly to the components of the combiner 115, 115 and 215 described above.

It is to be understood that the invention can be embodied in various forms, and is not to be limited to the examples discussed above. For example, additional frequencies could be accommodated with additional receiver components, and cross-wiped/de-spread according by adding the additional components for the additional frequencies to the configurations disclosed above. The correlator 12 provides significant advantages of scalability and flexibility for accommodating various GNSS signals from the multiple systems currently in place and projected. Moreover, components could be combined or separated in various combinations of ICs and discrete components as necessary for particular applications. Other components and configurations can be utilized in the practice of the present invention.

Having thus described the disclosed subject matter, what is claimed as new and desired to be secured by Letters Patent is:

1. A multi-frequency, cross-wiping global navigation satellite system (GNSS) receiver system, which comprises:

first and second GNSS RF antennas with respective first and second frequencies;

an analog downconverter connected to said first and second antennas and adapted for down converting analog signals therefrom;

said analog downconverter having sin and cosine functions for modifying said signals from said antennas and providing digital truth terms having in-phase (I) and in-quadrature (Q) components respectively;

a digital downconverter adapted for receiving said analog down converter output and providing I and Q digital signal outputs for said down converted first and second frequencies respectively;

a correlator including:
  first and second inputs each including I and Q signal component inputs adapted for receiving the I and Q components of said first and second signals respectively;
  an I adder connected to said first and second I component inputs and providing a combined I component output;
  a Q adder connected to said first and second Q component inputs and providing a combined Q component output;
  a first mixer connected to said I adder output and said second Q component input and adapted for mixing said signal components and providing a first frequency correlator output; and
  a second mixer connected to said Q adder output and said first I component input and adapted for mixing said signal components and providing a second frequency correlator output; and a GNSS solution processor connected to and receiving said first and second frequency cross-wiped single outputs from said correlator and providing GNSS location solutions there from.

2. An analog correlator for cross-wiping first and second digital signals with respective first and second frequencies and in-phase (I) and in-quadrature (Q) signal components, which correlator includes:

first and second inputs each including I and Q signal component inputs adapted for receiving the I and Q components of said first and second signals respectively;

an I adder connected to said first and second I component inputs and providing a combined I component output;

a Q adder connected to said first and second Q component inputs and providing a combined Q component output;

a first mixer connected to said I adder output and said second Q component input and adapted for mixing said signal components and providing a first frequency correlator output; and a second mixer connected to said Q adder output and said first I component input and adapted for mixing said signal components and providing a second frequency correlator output.

3. A digital correlator for cross-wiping first and second digital signals with respective first and second frequencies, which correlator includes:

first and second inputs adapted for receiving said first and second digital signals respectively;

1st and $2^{nd}$ in-phase (I) mixers connected to said $1^{st}$ and $2^{nd}$ inputs respectively;

1st and $2^{nd}$ in-quadrature (Q) mixers connected to said $1^{st}$ and $2^{nd}$ inputs respectively;

an I adder connected to said first and second I mixers and providing a combined I component output;

a Q adder connected to said first and second Q mixers and providing a combined Q component output;

a first IQ mixer connected to said I adder output and said second Q mixer output and adapted for mixing said signal components and providing a first frequency correlator output; and a second IQ mixer connected to said Q adder output and said first I mixer output and adapted for mixing said signal components and providing a second frequency correlator output.

4. The correlator according to claim 3 wherein said correlator signals comprise an intermediate frequency.

* * * * *